Dec. 30, 1930.  J. G. SWAIN  1,787,128
METHOD OF MAKING WIRE WHEELS
Filed Jan. 23, 1928
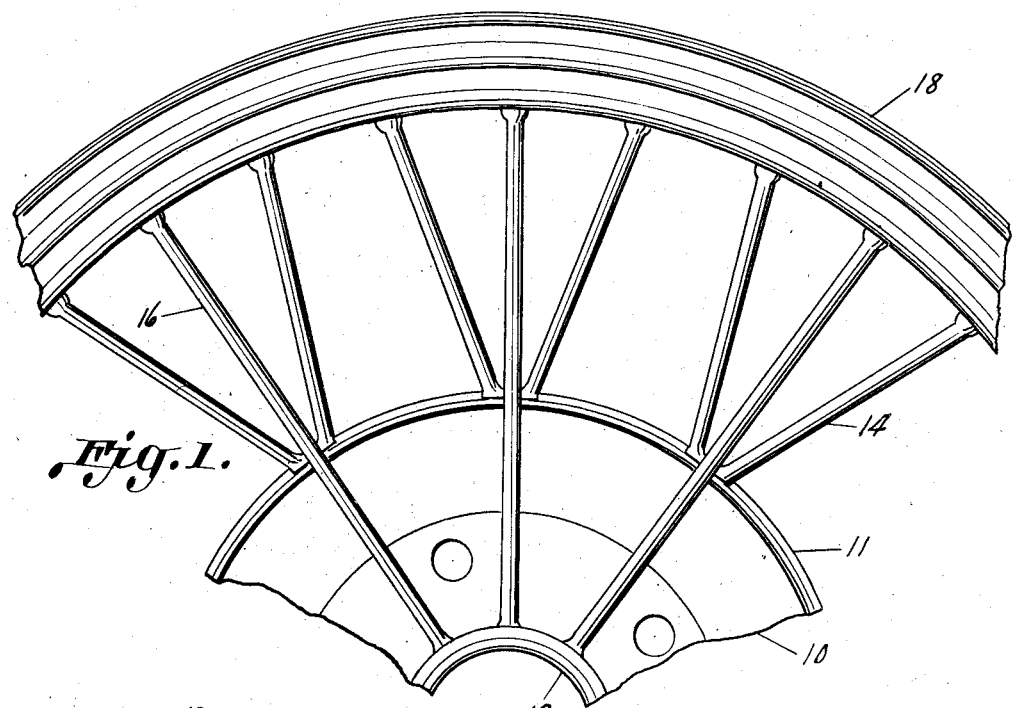
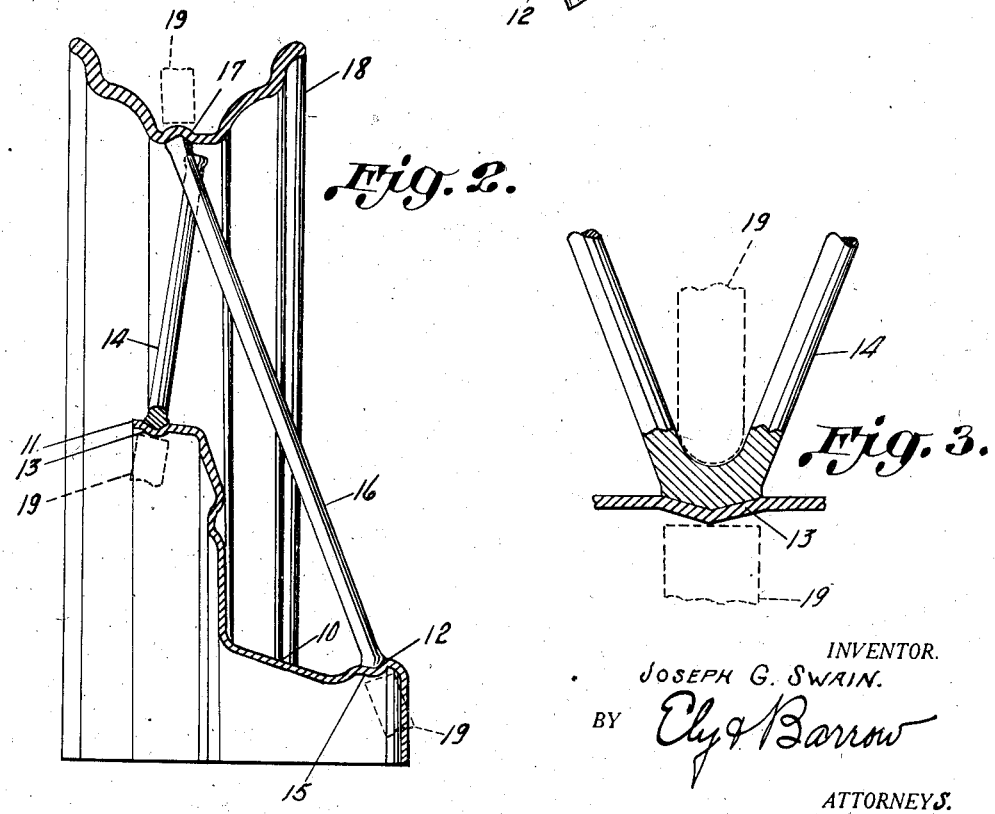
INVENTOR.
JOSEPH G. SWAIN.
BY Ely & Barrow
ATTORNEYS.

Patented Dec. 30, 1930

1,787,128

UNITED STATES PATENT OFFICE

JOSEPH G. SWAIN, OF AKRON, OHIO, ASSIGNOR TO THE FIRESTONE STEEL PRODUCTS COMPANY, OF AKRON, OHIO, A CORPORATION OF OHIO

METHOD OF MAKING WIRE WHEELS

Application filed January 23, 1928. Serial No. 248,647.

This invention relates to the manufacture of wire wheels, the spokes of which are maintained under radial compression.

The general purpose of the invention is to devise an improved method of manufacturing compression spoke wire wheels of the type disclosed in my prior Patent, No. 1,630,226, granted May 24, 1927. An object of the invention is to devise a method of making wire wheels involving pressing corresponding indentations in the rim and hub, positioning the spokes in the indentations, assembling under compression for locking the whole together mechanically, and pressing electric welding platens against the rim and hub in juxtaposition to the spoke ends for further compressing the spokes and for uniting the wheel parts into an integral structure.

The foregoing and other objects are obtained by the process illustrated in the accompanying drawings and described below. It is to be understood that the invention is not limited to the specific method set forth herein.

Of the accompanying drawings,

Figure 1 is a fragmentary elevation of a portion of a partially completed wheel made by a process embodying the invention;

Figure 2 is a transverse section thereof; and

Figure 3 is an enlarged scale detail section of a portion thereof.

Referring to the drawings, 10 represents a hub, preferably stamped or pressed from sheet metal, and formed with inner and outer lateral flanges 11 and 12. Spaced indentations 13 are pressed in the inner flange to receive the vertices of the V-shaped inner spokes 14, while indentations 15 pressed in the outer flange of the hub serve to seat the radially inner ends of outer spokes 16. The radially outer ends of all of the spokes are seated in spaced indentations 17 pressed in the rim or felly 18 of the wheel, all of the spoke ends and the vertices of the V-shaped inner spokes 14 being headed or upset to provide a contour conforming to the indentations in the rim and hub.

The wheel is assembled on a form, (not shown), which locates the rim in proper concentric position with respect to the hub. The rim is made somewhat larger in diameter and circumferential measurement than the finished dimensions of the wheel in order that the spokes may be placed in their proper, respective positions between the rim and the hub. The whole assembly is then placed in a suitable contracting machine, not shown, which squeezes the wheel felly or rim to a smaller diameter, thus locking the ends of the spokes in the depressions in the rim and hub. The wheel parts may be further locked together mechanically by heating the rim before it is squeezed to the smaller diameter, the rim then contracting upon cooling to produce a radial compression in the spokes.

To unite the whole wheel assembly into an integral unitary structure, the ends of the spokes are electrically welded in their seats by applying welding platens 19 to the convex faces opposite the indentations and in juxtaposition to the inner and outer spoke ends and to the vertices of the inner V-shaped spokes. The heat and pressure of the welder platens securely unites the spokes to the rim and hub and flattens out the indented portions to provide a uniform surface at the point of weld. The pressure of the welder platens operating in opposed directions against the ends of any single spoke, eliminates any tensional strain within the spokes, equalizes all strains in the wheel assembly, and affords a column loaded wheel with all spokes under a uniform compression. If desired the welding process may be modified by gripping one welder platen about the spoke close to its end and forcing the same in opposed relation to the platen contacting the convex face opposite the adjacent indentation, thus localizing the heating and compressing effect of the welder platens.

The structure produced by the process described is not limited to the precise form illustrated, and modifications of the method disclosed may be resorted to without departing from the spirit of the invention or the scope thereof as defined by the appended claims.

What is claimed is:

1. The method of manufacturing compression spoke wire wheels comprising pressing spaced external indentations about the inner and outer ends of a hub, pressing a series of circumferentially spaced indentations about the radially inner surface of an oversized rim, forming a series of straight outer spokes with upset ends conforming to the contour of the indentations in the hub and rim, forming a series of double inner spokes of a single wire bent to substantially V-shape, upsetting the vertices and the ends of said double spokes to conform to the contours of the indentations in the inner end of the hub and in the rim, respectively, positioning the spoke ends and vertices in alignment with their respective indentations in the hub and rim, contracting the rim onto the spokes to compress the latter against the hub, applying electrical welding platens to the rim and hub in juxtaposition to the ends of a spoke, and welding the parts together under heat and pressure to produce an integral, unitary structure free from unequal stresses.

2. The method of manufacturing compression spoke wire wheels comprising forming sets of confronting indentations in a rim and a hub, forming a series of spokes with upset ends conforming to the contour of the indentations in the hub and rim, positioning the spoke ends in alignment with their respective identations in the hub and rim, contracting the rim onto the spokes to compress the latter against the hub, applying electrical welding platens to the rim and hub in juxtaposition to the ends of a spoke, and welding the parts together under heat and pressure.

3. The method of manufacturing compression spoke wire wheels comprising forming sets of confronting indentations in a rim and a hub, positioning a series of spokes with their ends in alignment with their respective indentations in the hub and rim, contracting the rim onto the spokes to compress the latter against the hub, applying electrical welding platens to the rim and hub in juxtaposition to the ends of a spoke, and welding the parts together under heat and pressure.

4. The method of manufacturing compression spoke wire wheels comprising forming sets of confronting indentations in a rim and a hub, positioning a series of spokes with their ends in their respective indentations in the hub and rim, applying electrical welding platens to the rim and hub in juxtaposition to the ends of a spoke, and simultaneously welding the rim and the hub to the opposite ends of the spoke under heat and pressure.

5. The method of manufacturing compression spoke wire wheels comprising forming sets of confronting indentations in a rim and a hub, positioning a series of spokes with their ends in their respective indentations in the hub and rim, applying electrical welding platens to the rim and hub adjacent the junctions therewith of the ends of a spoke, and simultaneously heating said junctions locally while compressing the welding platens thereagainst to flatten out the indentations, to weld the rim and the hub to the opposite spoke ends, and to produce a radial compression in said spoke.

6. The method of manufacturing compression spoke wire wheels comprising forming sets of confronting indentations in a rim and a hub, positioning a series of spokes with their ends in their respective indentations in the hub and rim, applying electrical welding platens adjacent the junctions of the spoke ends and the hub or rim, and simultaneously heating said junctions locally while compressing the welding platens thereagainst to flatten out the indentations, to weld the rim and the hub to the opposite spoke ends, and to produce a radial compression in said spoke.

JOSEPH G. SWAIN.